United States Patent
Ratnakar (10) Patent No.: US 6,522,766 B1
(45) Date of Patent: Feb. 18, 2003

(54) WATERMARKING WITH RANDOM ZERO-MEAN PATCHES FOR COPYRIGHT PROTECTION

(75) Inventor: Viresh Ratnakar, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/270,258

(22) Filed: Mar. 15, 1999

(51) Int. Cl.⁷ ................................................ G06K 9/00
(52) U.S. Cl. ........................................ 382/100; 713/176
(58) Field of Search ................................. 382/100, 232; 380/54, 210, 252, 287; 713/176, 179; 348/461, 463

(56) References Cited

U.S. PATENT DOCUMENTS

| | | |
|---|---|---|
| 5,418,602 A | 5/1995 | Nishikawa |
| 5,530,759 A | 6/1996 | Braudaway et al. |
| 5,606,609 A | 2/1997 | Houser et al. |
| 5,617,119 A | 4/1997 | Briggs et al. |
| 5,621,503 A | 4/1997 | Komaki et al. |
| 5,664,018 A | 9/1997 | Leighton |
| 5,734,752 A | 3/1998 | Knox |
| 5,742,408 A | 4/1998 | Funada et al. |
| 5,745,604 A | 4/1998 | Rhoads |
| 5,790,703 A | 8/1998 | Wang |
| 5,819,289 A | 10/1998 | Sanford, II et al. |
| 5,822,432 A | 10/1998 | Moskowitz et al. |
| 5,822,660 A | 10/1998 | Wen |
| 5,825,892 A | 10/1998 | Braudaway et al. |
| 5,832,186 A | 11/1998 | Kawana |
| 5,915,027 A * | 6/1999 | Cox et al. ............... 380/54 |
| 6,154,571 A * | 11/2000 | Cox et al. ............. 382/250 |
| 6,226,387 B1 * | 5/2001 | Tewfik et al. .......... 382/100 |
| 6,292,167 B1 * | 9/2001 | Throup .................. 345/389 |

OTHER PUBLICATIONS

Petitcolas, et al., "*Attacks on Copyright Marking Systems*", Second Workshop on Information Hiding, vol. 1525 of Lecture Notes in Computer Science, Apr. 1998, pp. 218–238.

A.W. Paeth, "*A Fast Algorithm For General Raster Rotation*", Graphics Gems, A.S. Glassner, ed., 1990, pp. 179–195.

Ingemar J. Cox, et al., "*A Secure, Robust Watermark for Multimedia*", Workshop on Information Hiding, Newton Institute, Univ. of Cambridge, May 1996, pp. 1–16.

Joseph J.K. O'Ruanaidh, et al. "*Rotation, Scale and Translation Invariant Digital Image Watermarking*" (4 pages).

I. Pitas, "*A Method For Signature Casting On Digital Images*", IEEE, 1996, pp. 215–218.

* cited by examiner

Primary Examiner—Bhavesh Mehta
Assistant Examiner—Abolfazl Tabatabai
(74) Attorney, Agent, or Firm—Michael T. Gabrik (57) ABSTRACT

A steganographic method embeds hidden information like digital watermarks and digital fingerprints into an image by applying one or more zero-mean patches to a digital signal that conveys the image. Each zero-mean patch comprises elements having an average value substantially equal to zero. A copyright protection system is implemented by selecting one or more zero-mean patches in pseudo-random fashion, modifying the patches by perturbing their elements in pseudo-random fashion, and applying the patches to image pixels at locations that are selected in pseudo-random fashion. The copyright protection system further includes a procedure for checking for the presence of a watermark in a digital signal.

39 Claims, 6 Drawing Sheets

WATERMARKING WITH RANDOM ZERO-MEAN PATCHES FOR COPYRIGHT PROTECTION

TECHNICAL FIELD

The present invention pertains generally to digital image processing and relates more particularly to image processing that embeds inconspicuous identifying or authenticating information known as watermarks into an image and that detects the embedded information. The invention may be incorporated into systems and methods of copyright protection than can embed a watermark into an image that identifies the owner of that image, and can determine whether a suspected object is a copy or modified version of an original image.

BACKGROUND ART

The proliferation of computers with increasing computational power has contributed to the growth of digital image processing. Digital images are attractive because they can be copied without concern for image degradation, and because they can be easily modified, enhanced and adapted to provide high-quality images that meet a wide range of application requirements. These characteristics of digital images are also sources of concern for owners of images that wish to protect copyrights in the images or that wish to detect and identify sources of unauthorized copying.

In response to these concerns, there have been attempts to develop ways to embed information into other information or "cover objects" such as images that can identify the owner of the cover object or that can identify the device that was used to produce an unauthorized copy. In particular, there has been considerable effort to develop ways to hide identifying information in images that can be detected for identification purposes, yet is inconspicuous to normal viewing and is resistant to unauthorized attempts to remove it.

On the one hand, the identifying information should be inconspicuous in the sense that it does not visibly alter the image and yet is detectable using appropriate recovery techniques. On the other hand, the identifying information should also be resistant to image processing techniques such as compression, cropping, rotation, translation, scaling, edge enhancement and other types of filtering operations, and should be resistant to processing techniques intended to remove or obscure the embedded information. Unfortunately, these goals conflict with each another.

Two basic types of information hiding techniques have been developed to embed information that is robust and resistant to various types of image processing. One type of technique embeds the information in a spatial or pixel domain. The second type of technique embeds the information in a spectral or frequency domain.

An evaluation tool for information hiding techniques commonly referred to as StirMark is described in Petitcolas, et al., "Attacks on Copyright Marking Systems," Second workshop on information hiding, vol. 1525 of Lecture Notes in Computer Science, April 1998, pp. 218–238. Use of the StirMark tool has shown that each known hiding technique offers some advantages over other techniques but, unfortunately, no known technique is resistant to a sufficiently broad range of image processing techniques. Techniques that are resistant to some types of image processing are vulnerable to others.

What is needed is an information hiding technique that can embed inconspicuous identifying information into an image in a manner that resists unauthorized removal of the information by a wide range of image processing techniques. In this sense, identifying information is considered resistant to removal if image processing degrades the image to an unacceptable level before the identifying information is no longer detectable.

DISCLOSURE OF INVENTION

It is therefore an object of the present invention to provide for efficient embedding of information into a cover object such as an image that is inconspicuous yet resistant to removal or alteration by a wide range of signal processing techniques, and for the efficient detection of the embedded information.

According to one aspect of the present invention, a digital input signal comprising signal elements is processed by: identifying a selected patch from a plurality of zero-mean patches, where each zero mean patch comprises an anchor patch element and one or more other patch elements and the average value of all patch elements in a given patch is substantially equal to zero; identifying an anchor signal element corresponding to a selected location within the digital input signal; and processing each patch element of the selected patch with a respective signal element of the digital input signal, wherein the anchor patch element is processed with the anchor signal element and the one or more other patch elements are processed with other respective signal elements.

This digital input signal processing technique may be implemented on an appropriate apparatus, such as a computer system. Moreover, the technique may be embodied in a program of instructions for execution by the computer.

Throughout the disclosure of the present invention, more particular mention is made of cover objects that are images conveyed by digital signals. It is anticipated that the present invention may have greater advantages in image processing applications; however, the principles of the present invention are not limited to images and can be applied to a wide range of cover objects including text and audio.

As mentioned above, the present invention is carried out by processing signals with zero-mean patches. The term "patch" refers to a set of discrete elements that are arranged to suit the needs of each application in which the present invention is used. In image processing applications, the elements of a single patch are arranged to coincide with digital image "pixels" or picture elements. Patch elements may be arranged in essentially any pattern. Throughout the following disclosure, embodiments are discussed in which patch elements are arranged within a square area; however, no particular arrangement of patch elements is critical to the practice of the present invention.

The term "zero-mean patch" refers to a patch that comprises elements having values the average of which is substantially equal to zero. An average value is substantially equal to zero if it is either exactly equal to zero or differs from zero by an amount that is arithmetically insignificant to the application in which the zero-mean patch is used. A wide variety of zero-mean patches are possible but, by way of example, only a few basic patches with unit magnitude elements are disclosed herein.

The present invention relies on the fact that for a digital signal conveying essentially any meaningful image (which would include natural images as well as synthetic graphics) zero is the expected value of the correlation score for a large number of small zero-mean patches that are located at random locations within the digital signal. The correlation score may be expected to equal zero because, over small regions of a meaningful image, digital signal intensities vary slowly almost everywhere in the image. Signal element or "pixel" intensities vary much more quickly at edges appearing in the image; however, for a large number of random locations, the edge contributions to the correlation score can be expected to substantially cancel one another.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

MODES FOR CARRYING OUT THE INVENTION

A. Overview

1. Signal Processing Method

Figure 1:
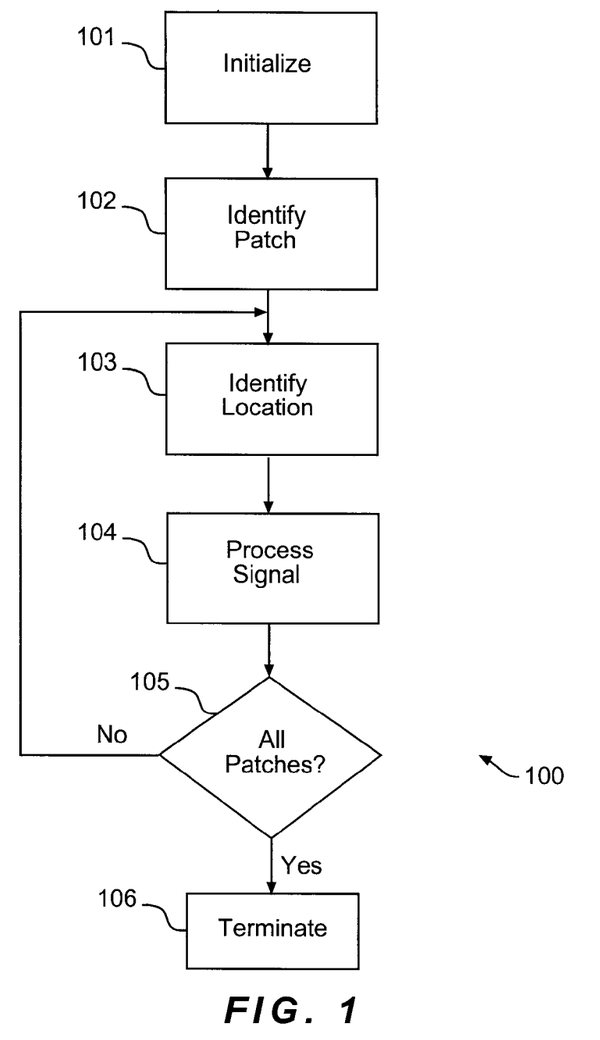
FIG. 1 illustrates steps in a method for embedding information into a cover object and for detecting such embedded information.
Figure 2A:
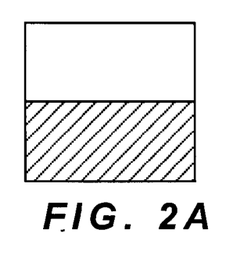
FIGS. 2A through 2D are schematic representations of four zero-mean patches.
Figure 2B:
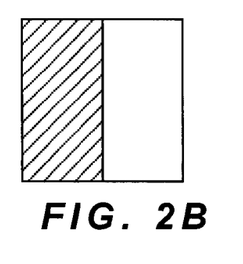
Figure 2C:
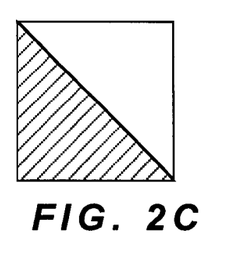
Figure 2D:
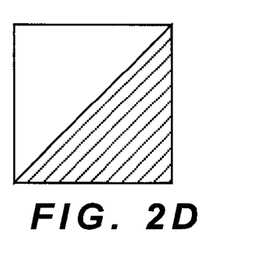

The diagram shown in FIG. 1 illustrates steps in method 100 for embedding information such as a watermark or a fingerprint into a cover object such as a digital signal conveying an image and for detecting such embedded information. The term "watermark" sometimes refers to embedded information that indicates ownership of the associated cover object. As such, the presence or absence of the watermark can indicate whether an entity is the owner of a cover object. The term "fingerprint" sometimes refers to embedded information that identifies the origin of a particular copy of a cover object. For example, a fingerprint can convey the serial number of the printer that was used to obtain a printed copy of the cover object. In this disclosure, the term "watermark" is used as a generic reference to essentially any type of embedded information.

Step 101 performs initialization activities such as initializing a random number generator or initializing information used to control the execution of subsequent steps. A sequence of pseudo-random numbers obtained from a so called random number generator may be used to enhance the resistance of embedded information to unauthorized removal. Preferably, the random number generator is cryptographically strong in the sense that the particular sequence of numbers obtained from the generator varies in response to a "seed" or initialization value, no output of the generator can be predicted without knowing the seed, and it is infeasible to determine the seed that will make the generator produce any particular sequence of numbers. Although the sequence of numbers obtained from a random number generator are not truly random, such sequences are referred to herein as random for simplicity.

Step 102 identifies and selects a patch from a plurality of zero-mean patches. In preferred embodiments, the patch selection is random according to a sequence of random numbers. If desired, the elements of a selected patch may be modified or perturbed in some random fashion. Furthermore, the size of the patch may be chosen at random from a range of sizes.

Schematic representations of four basic zero-mean patches are illustrated in FIGS. 2A through 2D. Four additional patches may be formed by reversing the shaded and unshaded areas. The shaded area in each patch represents patch elements having a value of −1. The unshaded area in each patch represents patch elements having a value of +1. As illustrated, the boundary between areas is represented as a straight line; however, the boundary in an actual patch is chosen so that exactly half of the patch elements have a value equal to +1 and the remaining half of the elements have a value of −1. If a patch has an odd number of elements, the center element is given a value of zero. Each element of a selected patch can be scaled by a fixed amount or by a random value. In one embodiment discussed below, patch elements are scaled as they are combined with the cover object.

Figure 3:
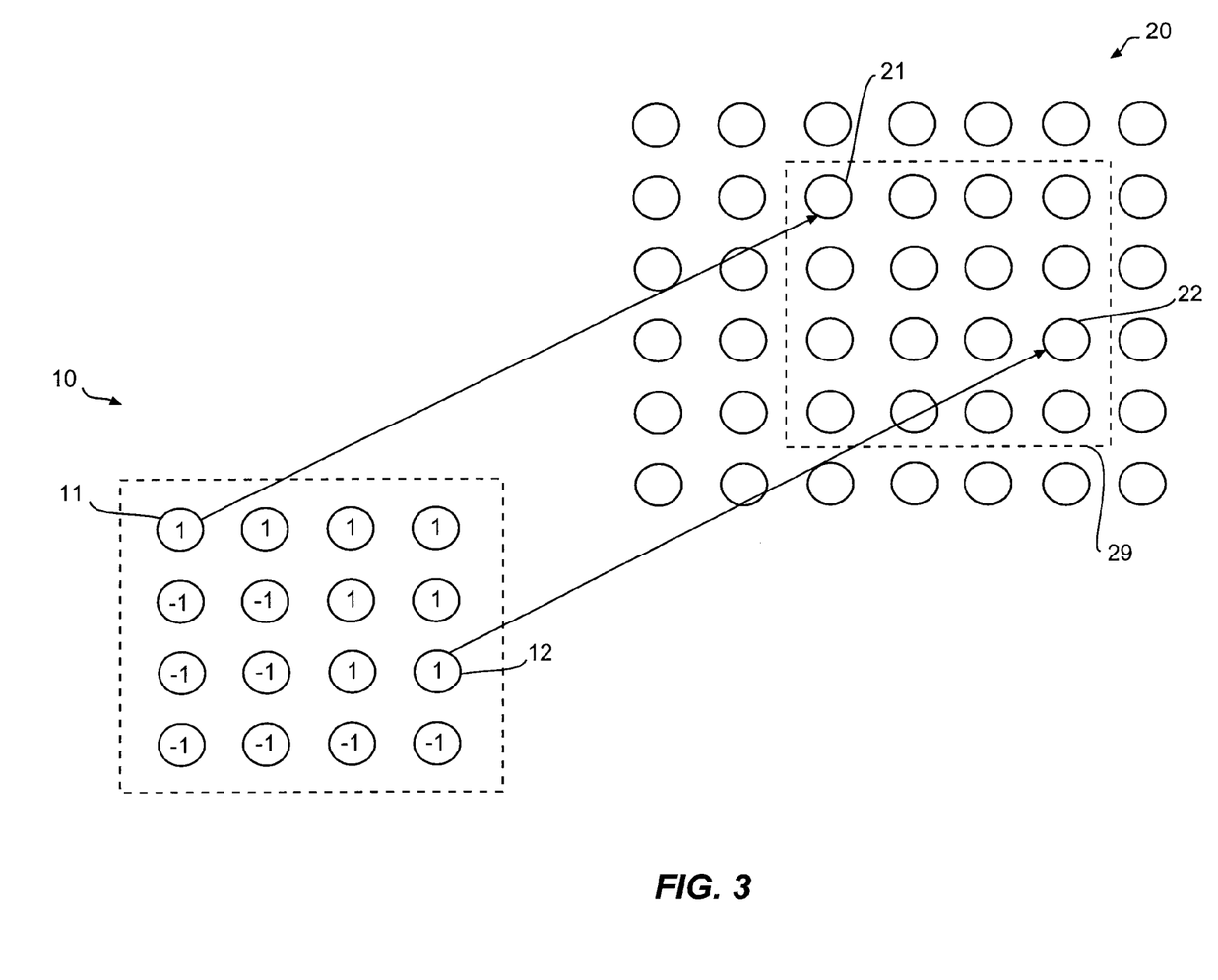
FIG. 3 illustrates a zero-mean patch that is aligned with a digital signal.

One element of each zero-mean patch is designated an "anchor patch element" and is used to align the patch with an "anchor signal element" at a specified location in the cover object. For ease of discussion and illustration, the following disclosure and the accompanying figures assume each patch comprises a square array of unitary magnitude elements in which the anchor patch element is in the upper left corner. Referring to FIG. 3, patch 10 corresponds to the basic patch shown in FIG. 2C that comprises a 4×4 array of patch elements in which element 11 is the anchor patch element.

Referring again to FIG. 1, step 103 identifies an anchor signal element that corresponds to a selected location within the cover object. Preferably, the location within the cover object is selected in a random fashion.

Step 104 aligns the anchor element of the selected patch with the anchor signal element and processes the elements of the selected patch with respective elements of the cover object to either apply a patch or to check for the presence of a patch. Ways in which this processing may be carried out are discussed below.

If the cover object is processed for more than one patch, step 105 determines if all processing has been completed. If not, steps 102 through 104 continue by selecting another patch and processing the cover object at another location. When the processing for all patches has been completed, step 106 terminates the method.

2. Embedding Information

According to the present invention, information may be embedded into a cover object by applying one or more zero-mean patches to the digital signal conveying the cover object. This may be accomplished in a wide variety of ways. The following sections explain a general approach.

a. Applying a Watermark

An embodiment of method 100 for applying embedded information such as a watermark is shown in the following program fragment. This program fragment is expressed in pseudo-code using a syntax that includes some syntactical features of the C program language. This program fragment and other program fragments described herein are not intended to be source code segments suitable for compilation but are provided to convey a few aspects of possible implementations.

```
ApplyWatermark (I, K) {
    InitRNG (K);                    //initialize random number generator
    (W, H) = GetSize (I);           //get image width and height
    do L times {                    //apply L patches
        P = SelectPatch (RNG (0, N-1));
        do M times {                //perturb each patch M times
            //select a pair of random locations in each patch
            (x1, y1) = (RNG (0, B-1), RNG (0, B-1));
            (x2, y2) = (RNG (0, B-1), RNG (0, B-1));
            //perturb patch elements by value Q
            P (x1, y1) = P (x1, y1) + Q;
            P (x2, y2) = P (x2, y2) - Q;
        }
        //obtain random location within digital Signal I
        (x3, y3) = (RNG (0, W-1), RNG (0, H-1));
        AddPatch (I, P, x3, y3, G);  //add a patch
    }
}
```

In this program fragment, routine ApplyWatermark applies L zero-mean patches of size B×B to a digital signal I. The function RNG(a, z) is a random number generator that returns a random number within the range from a through z and routine InitRNG initializes the random number generator using the seed value K. The function GetSize returns the width W and height H of the image conveyed by digital signal I. The function SelectPatch is used to randomly select each patch P from a set of N zero-mean patches.

As shown in the program fragment, pairs of elements within each selected patch are selected randomly and the values of the selected elements are perturbed by an amount Q. The value for one element in the pair is increased by the amount Q and the value of the other element in the pair is decreased by the amount Q so that the zero-mean property of the patch is preserved. In another embodiment, the value of Q is selected randomly. These perturbations may be done to increase the difficulty of finding a patch in a watermarked cover object; however, care should be taken to avoid perturbing the patches to such an extent that the resulting patch has significant high-frequency content. Patches with high-frequency content can usually be removed from a cover object by simple low-pass filtering.

The routine AddPatch is invoked to add patch P to digital signal I at a random location (x3, y3) using a gain factor G. This routine is discussed in more detail below.

b. Applying a Patch

In embodiments of method 100 that apply a patch, step 104 processes the digital signal conveying the cover object by combining each patch element with a respective corresponding signal element. In FIG. 3 anchor patch element 11 in patch 10 is shown aligned with anchor signal element 21 in digital signal 20. According to this alignment, patch element 11 corresponds to signal element 21 and patch element 12 corresponds to signal element 22. Broken line 29 illustrates the outline of patch 10 when it is aligned in this manner. Corresponding elements may be combined by addition, for example.

An embodiment of step 104 for applying a patch is shown in the following program fragment:

```
AddPatch (I, P, x, y, G) {
    for i = 1 to B
        for j = 1 to B
            I (x+j, y+i) = I (x+j, y+i) + G * P (j, i);
}
```

In this program fragment, routine AddPatch combines elements in patch P with corresponding elements in digital signal I having respective anchor elements aligned at selected location (x, y). Each patch element is scaled by a gain factor G that may be chosen to balance a tradeoff between having the applied patch be inconspicuous and improving the probability that the patch can be detected despite subsequent modifications to the marked image. In this implementation as in other implementations discussed herein, the patch P is assumed to be square. The length of the patch on each side is represented in the program fragment by the symbol B.

Additional refinements may be incorporated into practical embodiments as necessary or as desired. For example, elements at coordinates (x+j, y+i) that lie outside the boundaries of digital signal I need not be modified. In such an embodiment, the dimensions of the image represented by signal I can be provided to the routine or it can be derived in some manner. Another refinement limits the value of the signal element value resulting from the combination of a patch element and a corresponding signal element to the allowed dynamic range of the signal elements. For example, if signal elements in digital signal I have a dynamic range from 0 to 255, then element values that result from combining patch and signal elements should be limited to this range.

3. Detecting Embedded Information a. Detecting a Watermark

An embodiment of method 100 for detecting embedded information such as a watermark is shown in the following program fragment. This program fragment is similar to the one shown above for applying a watermark.

```
MeasureWatermark (J, W, H, K) {
    InitRNG (K);                    //initialize random number generator
    C = 0;                          //initialize correlation score
    do L times {                    //correlate L patches
        P = SelectPatch (RNG (0, N-1))
        do M times {                //perturb each patch M times
            //select a pair of random locations in each patch
            (x1, y1) = (RNG (0, B-1), RNG (0, B-1));
            (x2, y2) = (RNG (0, B-1), RNG (0, B-1));
            //perturb patch elements by value q
            P (x1, y1) = P (x1, y1) + Q;
            P (x2, y2) = P (x2, y2) - Q;
        }
        //obtain random location within digital signal I
        (x3, y3) = (RNG (0, W-1), RNG (0, H-1));
        C = C + CorrelatePatch (J, P, x3, y3); //calculate score
    }
    return (C/L);                   //return average correlation score
}
```

In this program fragment, routine MeasureWatermark returns the average score of the correlation between digital signal J and all of the L patches. The width W and height H of the original image conveyed by signal I are needed for proper operation of this routine. These dimensions are provided to this routine rather than being derived from digital signal J because, even if digital signal J was copied or derived from digital signal I, the dimensions of the image represented by digital signal J could have been changed by some form of image processing. The routine CorrelatePatch, which is discussed below, calculates the correlation between patch P and digital signal J at location (x3, y3).

This program fragment lacks a number of features that are required for the detection of a watermark in a practical application. For example, some provision should be made for image processing techniques that may have been used to modify the image that is conveyed by digital signal J. Some examples of such image processing includes cropping, rotation, translation and image warping. Some provision can be made by measuring watermarks in a number of different images within a "search space" formed from various translations of digital signal J.

b. Detecting a Patch

In embodiments of method 100 that check for the presence of a patch, step 104 processes the digital signal conveying the cover object by calculating a correlation score for each patch element with a respective corresponding signal element. Referring again to the example illustrated in FIG. 3, the correlation between patch element 11 and signal element 21 and the correlation between patch element 12 and signal element 22 are included in the calculation. The correlation score may be calculated by summing the products of corresponding elements.

An embodiment of step 104 for calculating the correlation score for a patch is shown in the following program fragment:

```
CorrelatePatch (J, P, x, y) {
    c = 0;        //initialize correlation score
    for i = 1 to B
        for j = 1 to B
    c = c + J (x+j, y+i) * P (j, i);
    return c;     //return the correlation score
}
```

In this program fragment, function CorrelatePatch calculates the correlation score between selected patch P and digital signal J having respective anchor elements aligned at selected location (x, y). Additional refinements may be incorporated into practical embodiments as necessary or as desired. For example, elements at coordinates (x+j, y+i) that lie outside the boundaries of digital signal J should not be included in the correlation score. The size of the image conveyed by digital signal J can be provided to the routine for this purpose.

4. Alternative Signal Processing Method

Figure 4:
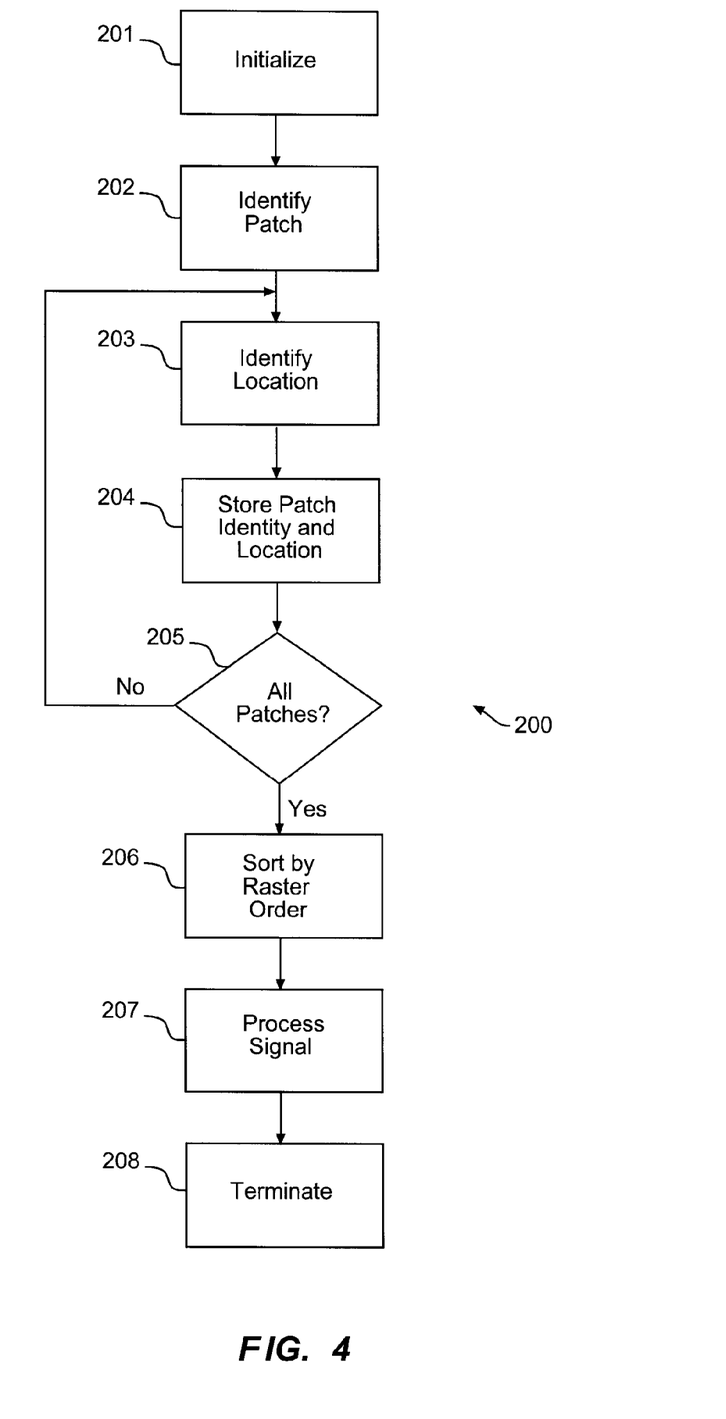
FIG. 4 illustrates steps in a method for embedding information into a cover object conveyed by a digital signal.

The diagram shown in FIG. 4 illustrates steps in method 200 for embedding information into a cover object conveyed by a digital signal. This second method is very similar to the first method described above but is preferable in many implementations because it processes the signal elements in raster order. This aspect reduces the memory required to store the digital signal and also reduces the processing delays required to receive, buffer, process and subsequently transmit the digital signal.

Referring to FIG. 4, step 201 performs initialization activities such as initializing a random number generator or initializing information used to control the execution of subsequent steps. Step 202 identifies and selects a patch from a plurality of zero-mean patches. Step 203 identifies an anchor element in the digital signal that corresponds to a selected location within the digital signal. Step 204 stores the identity (the information need to reproduce the patch, such as the bits produced by the random number generator) and anchor locations for subsequent use. If the information conveyed by the digital signal is to be processed for more than one patch, step 205 determines if all patches have been selected. If not, steps 202 and 203 continue by selecting another patch and another location in the digital signal.

When all patches have been selected, step 206 obtains the locations and patch identities stored by step 204 and sorts this information by location according to raster order. For example, if the digital signal I is represented by signal elements arranged in lines, this may be accomplished by a sort in which signal element position by line is the major sort order and the position within each line is the minor sort order.

Step 207 then processes the digital signal in a manner similar to that described above for the first method. Patches are applied by combining patch elements with signal elements and patches are detected by correlating corresponding patch elements and signal elements. Because signal elements are processed in raster order, the entire digital signal does not need to be stored in memory at one time. Each signal element can be processed independently. This method is particularly attractive in applications that wish to reduce implementation costs by reducing memory requirements and/or wish to reduce processing delays by avoiding the need to receive an entire digital signal before performing the desired signal processing.

Step 208 carries out the activities needed to terminate method 200.

B. Copyright Protection System

The principles of the methods described above may be incorporated into systems and methods of copyright protection that can mark a cover object with information that identifies the owner of the cover object, and can determine whether a suspected object is a copy or modified version of an "original" cover object.

1. Applying a Watermark

In one scheme for a copyright protection system, an owner of one or more cover objects to be protected first generates a pair of secret and public keys (S, U) and registers the public key U with a server. The server returns a unique identifier O to the owner. When the owner wishes to distribute a marked copy of digital signal I, the owner generates a random sequence R of bits and applies a watermark to a copy of digital signal I using a watermarking procedure such as that illustrated in the following program fragment.

```
PutWatermark (I, O, S, R) {
    K = DigitalSignature (O, S, R);    //generate signature
    Im = I;                             //make copy of original image
    ApplyWatermark (Im, K)              //mark the image copy
    M = MarkID (K, W, H)                //determine watermark id
}
```

In this program fragment, routine DigitalSignature is used to obtain a digital signature K using the owner identifier O, the secret key S, and the random sequence R of bits. In an alternative embodiment, the digital signal I is also used to generate the digital signature K. Preferably, sequence R is not obtained from the random number generator RNG used to apply the watermark. A copy Im is made of digital signal I and subsequently marked using routine ApplyWatermark as described above. The set of digital signature K, and the width W and height H of the image represented by digital signals I and Im represent an identifier for the watermarked signal. These three values may be stored as a watermark identifier or they may be used by a routine MarkID to generate a watermark identifier M. Because the digital signature K varies with different random sequences R, the owner may generate additional marked copies of digital signal I with corresponding watermark IDs by merely repeating the application of PutWatermark using a different random sequence R.

After applying the watermark, the owner stores the watermark identifier M together with the marked signal Im for possible future use. Alternatively, the watermark identifier may be stored with the original digital signal I and the random sequence R so that the owner can recreate the marked signal Im if necessary. The marked digital signal Im may be distributed as desired.

2. Detecting a Watermark

A watermark should be detected in digital signal J even if it is a version of digital signal I that is not an exact duplicate. For example, digital signal J may represent an image that is a cropped, rotated, scaled, translated or filtered version of the original image represented by digital signal I. Because of this, a number of variations to digital signal J in an "image search space" should be examined for a possible watermark. The total image search space may be denoted $F_R \times F_S \times f_O$.

The notation $F_R = \{f_R\}$ represents the set of image rotations and image flips to be examined. Each element $f_R$ of the set corresponds to a particular rotation or flip of the image represented by digital signal J. Typically, the set is limited to rotations of no more than about three degrees in steps of about 0.1 degrees. Smaller angles are tried first. Rotations may be carried out in a number of ways including nearest-neighbor resampling of pixels (signal elements) and the three-shear rotation method described in A. W. Paeth, "A Fast Algorithm for General Raster Rotation," published in *Graphics Gems*, A. S. Glassner, ed., 1990, pp. 179–195.

The notation $F_S = \{f_S\}$ represents the set of image scaling operations to be examined. Each element $f_S$ of the set corresponds to a particular scaling of the image represented by digital signal J. Typically, the set is limited to a scaling range from about 0.95 to about 1.05 in steps of about 0.01. Scaling may be carried out in a number of ways including nearest-neighbor resampling of pixels.

The notation $F_O = \{f_O\}$ represents the set of image offset or translation operations to be examined. Each element $f_S$ of the set corresponds to a particular offset of the image represented by digital signal J. Typically, the set includes offsets in both the horizontal and vertical directions that can be limited based on prior information or complexity requirements. Preferably, a coarse increment on the order of B/2, where B is the size of the zero-mean patches, is used first and an increment of one pixel is used to refine the search about the highest average correlation scores.

Figure 5:
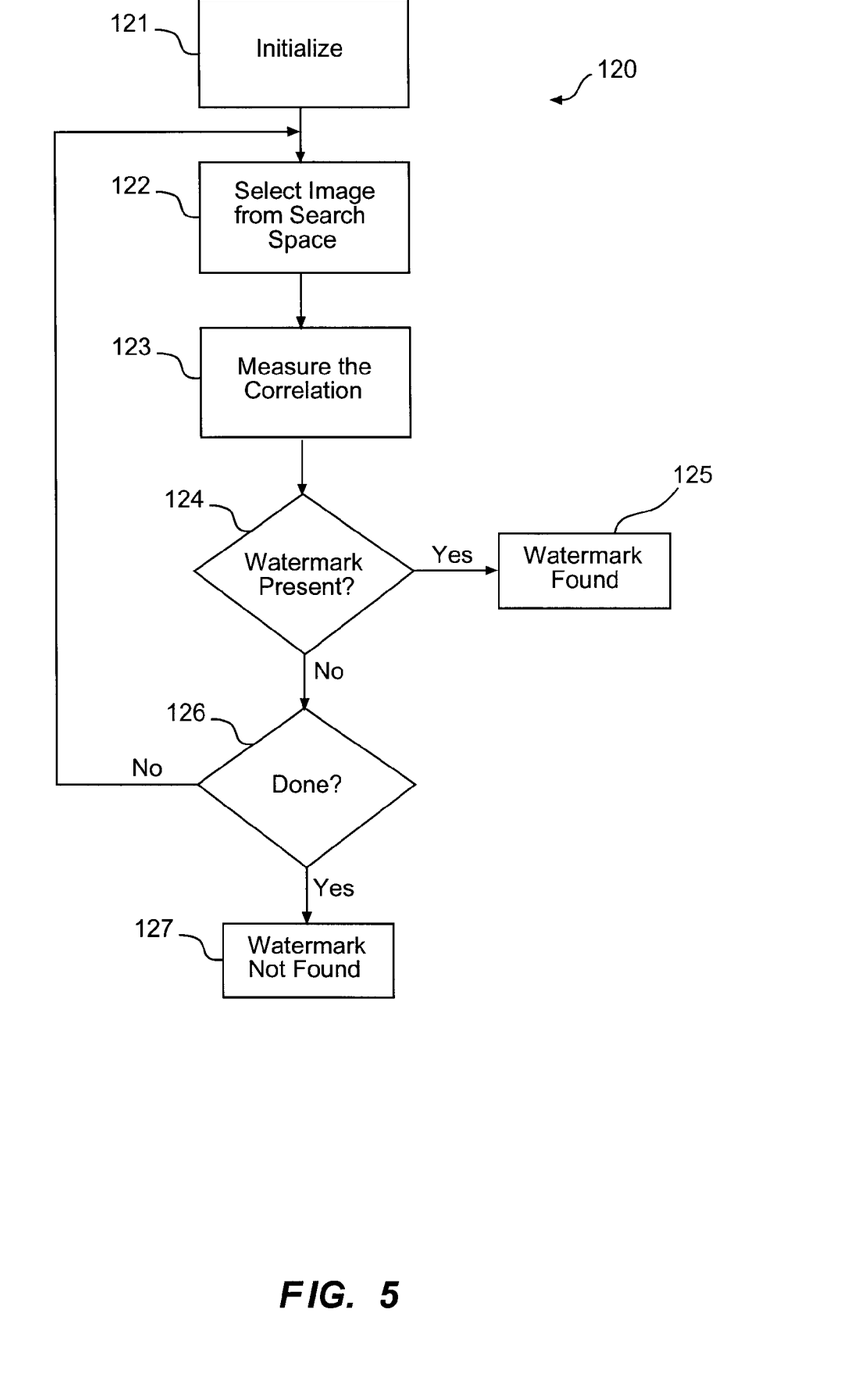
FIG. 5 illustrates steps in a method for detecting a watermark.

The diagram in FIG. 5 illustrates steps in method 120 for detecting a watermark. Step 121 performs initialization activities. Step 122 selects an image from the search space and step 123 measures the correlation between the selected image and the anticipated watermark. Step 124 determines whether the measured correlation is high enough to conclude the watermark is present in the selected image. If it is high enough, step 125 generates an indication that the watermark is present and terminates the method. If the measured correlation is not high enough, step 126 determines whether any other images are to be selected from the search space and examined. If so, the method returns to step 122. If not, step 127 generates an indication that the watermark was not found in any of the selected images and terminates the method.

The presence of a watermark in a suspected digital signal J may be checked using a watermarking checking procedure such as that illustrated in the following program fragment. If the routine returns the value False, it only means a particular watermark was not found in the image search space. A larger search space can be used if desired.

```
CheckWatermark (J, M) {
    (K, W, H) = M              //get signature, original width and height
    for i = 1 to Z {
        K' = RNG (0, 2^k–1);   //generate random key
                               //select random image from search space
        Jm = SearchSpace(J, RNG);
        cs (i) = MeasureWatermark (Jm, W, H, K');    //random correlation
    }
    sd = StandardDeviation (cs, Z);      //std deviation of random correlation
    for each (f_R f_S f_O) in F_R × F_S × F_O {      //for each image in the search space
        Jm = SearchSpace (J, (f_R f_S f_O))          //get image from search space
        if MeasureWatermark (Jm, W, H, K) > t * sd then
            return True;
    }
    return False;                        //watermark not found
}
```

The digital signature K and the width W and height H of the original image is obtained from the watermark identifier M. Using the function MeasureWatermark, a measure of random watermark correlation cs is obtained using randomly generated keys K' and images randomly selected from the image search space. The standard deviation sd of these random correlation scores is used in a threshold t*sd, where t typically is equal to 5.

Next, images in the search space are examined in turn. If the MeasureWatermark routine returns an average correlation score for a particular image Jm that exceeds the threshold t*sd, then function CheckWatermark returns the value True indicating the watermark was found. If not, the routine continues with the remaining images in the search space. If the watermark is not found in any of the images in the search space, the function CheckWatermark returns the value False.

If the owner of digital signal I determines that digital signal J contains a particular watermark, subsequent steps may be taken to resolve the situation. If the owner of digital signal J disputes the ownership claims made by the owner of digital signal I, subsequent steps can be taken to arbitrate the dispute. These are described below.

3. Arbitrating a Watermark Dispute

A few additional procedures are used to implement arbitration procedures in a copyright protection system. One additional procedure authenticates the digital signature of an owner. This may be represented as function AuthenticateOwner(O, M), which authenticates the digital signature K for owner O and is the verification counterpart of the function DigitalSignature. If the signature generation step in PutWatermark also used the original image then the function AuthenticateOwner will also need to use the original image.

Another procedure is function Distance(I, J) that evaluates the similarity between images represented by two digital signals I and J. Alternatively, the similarity of two images can be assessed by visual inspection.

Figure 6:
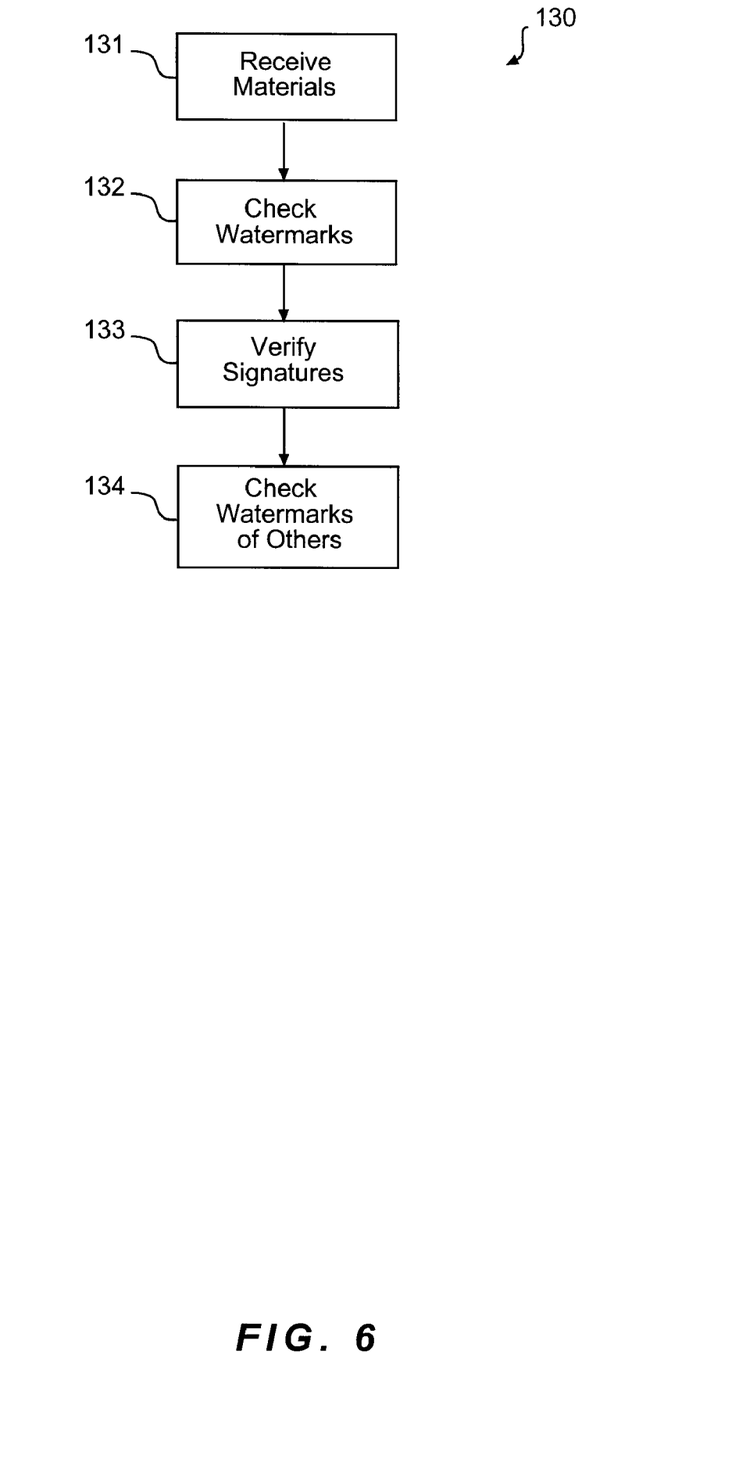
FIG. 6 illustrates steps in a method for assisting in the resolution of disputes over ownership of an image represented by a digital signal.

The diagram in FIG. 6 illustrates steps in method 130 for assisting in the resolution of disputes over ownership of an image represented by digital signal J. In step 131, an arbitrator receives from all contending owners O(i) their respective watermark identifier M(i) and an original image digital signal I(i). In step 132, the arbitrator rejects the ownership claims of those contending owners O(i) that cannot demonstrate the presence of their respective watermarks in digital signal J. This may be accomplished using function CheckWatermark(J, M(i)) discussed above. In step 133, the arbitrator rejects the ownership claims of those contending owners O(i) that cannot verify their respective digital signature K(i), obtained from their respective watermark IDs M(i). This may be accomplished using the verification function AuthenticateOwner(O(i), M(i)). In step 134 the arbitrator rejects the ownership claims of those contending owners O(i) that cannot produce an original digital signal I without the watermark of any other contending owner O(j).

Step 134 may be required if one or more contending owners have applied their own watermarks to a digital signal already containing the watermark of another contending owner. Assuming a watermark cannot be removed, only the owner possessing the earliest watermarked image can produce a digital signal that does not have the watermarks of all other contending owners.

This method cannot identify the true owner of the digital signal J if that owner is not included among the contending owners. Only the earliest marking owner can be identified. Furthermore, this method cannot resolve the dispute between two or more contending owners that independently obtained copies of a digital signal and then applied their respective watermarks.

One embodiment of method 130 described above is implemented by the following program fragment in which each owner provides both an original digital signal I and a marked digital signal Im.

```
Arbitrate (J, O, I, Im, M, α) {
    for i = 1 to α {
        if CheckWatermark(J, M(i)) is False or
            CheckWatermark(Im(i), M(i)) is False or
            Distance(I(i), J) > DMAX or
            Distance(Im(i), J) > DMAX or
            AuthenticateOwner(O(i), M(i)) is False then Reject(O(i));
    }
    for each O(i) not rejected {
        for each O(j) not rejected {
            if (j ≠ i) and CheckWatermark(Im(i), M(j)) is True then
                exit loop;
        }
        Accept(O(i));
    }
}
```

The routine Arbitrate receives the disputed digital signal J and arrays of owner IDs O, original digital signals I, marked digital signals Im, and watermark IDs M for each contending owner. The parameter a is the number of contending owners. The "for" loop carries out steps 132 and 133 discussed above, and also determines if the disputed digital signal J and the original and marked digital signals I and Im are sufficiently similar. The "for each" loop carries out step 134 described above. The routine Reject(O(i)) discards the owner i from further consideration. The Accept(O(i)) routine indicates the owner O(i) is a potentially valid owner of the digital signal J.

The arbitration method described thus far has a disadvantage in that the arbitrator that uses the routine Arbitrate could make an improper use of the information disclosed by each contending owner. For example, having received the watermark identifier M(i) for owner O(i), the arbitrator can extract the digital signature K and use that signature to mark other digital signals with the owner's watermark. One way in which this exposure can be avoided is to include the digital signal itself in the generation of the key. As mentioned above, the digital signal I may be used in an alternative embodiment of DigitalSignature for the generation of a digital signature routine. In this case, the digital signature must also be provided to AuthenticateOwner(O, I, M). Systems that use the digital signal I in the generation of digital signatures have the advantage that the signature of an owner O cannot be used by even an arbitrator to forge or remove a watermark from another image that belongs to the owner O.

C. Implementation

Figure 7:
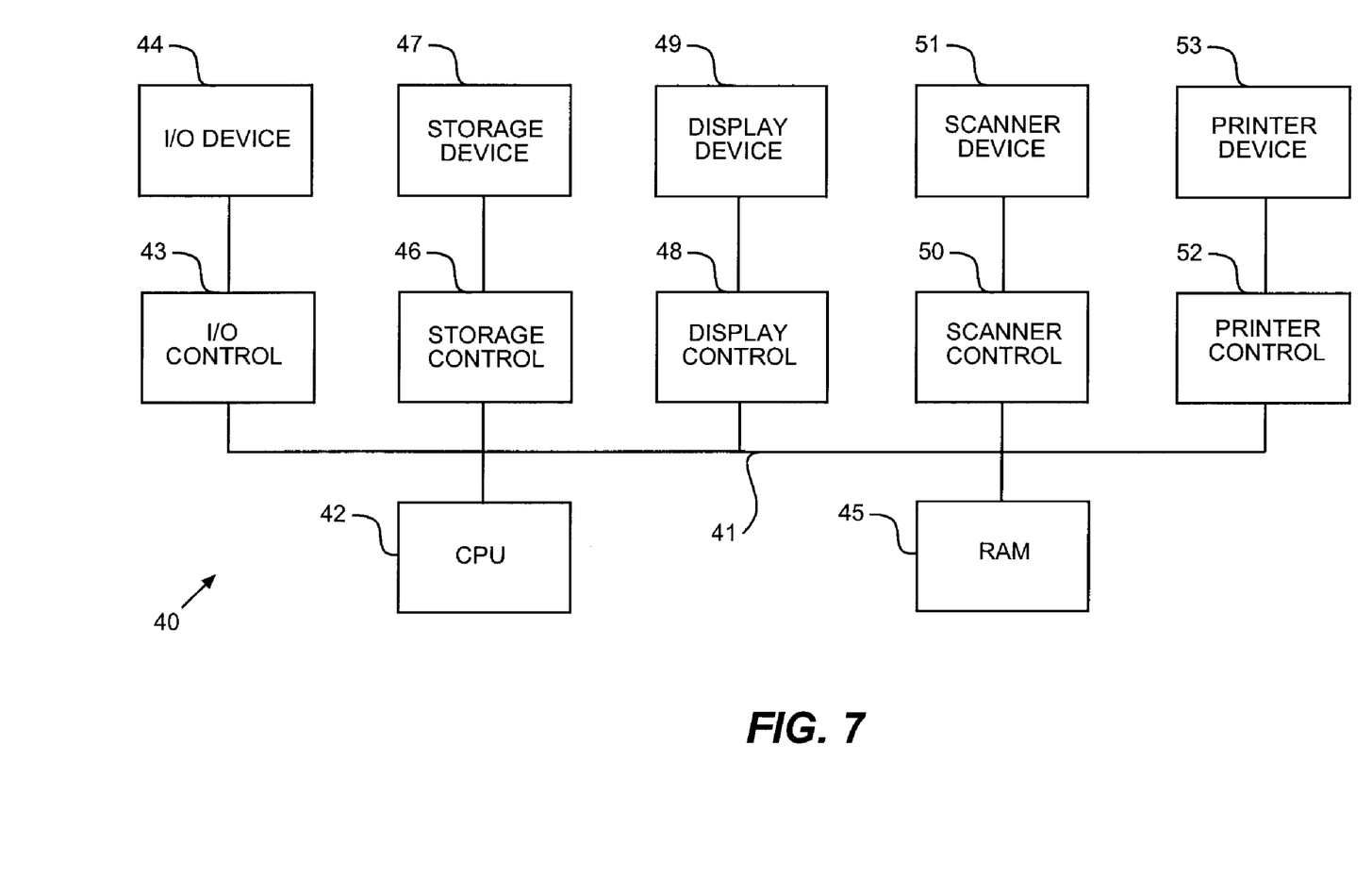
FIG. 7 is a functional block diagram of a typical computer system that may be used to implement various aspects of the present invention.

The present invention may be implemented in a wide variety of ways including software in a typical computer system. FIG. 7 is a functional block diagram of a typical computer system 40 that may be used to implement various aspects of the present invention. CPU 42 provides computing resources. I/O control 43 represents an interface to I/O device 44 such as a keyboard or mouse. RAM 45 is system random access memory (RAM). Storage control 46 represents an interface to storage device 47 that includes a storage medium such as magnetic tape or disk, or an optical medium. The storage medium may be used to record programs of instructions for operating systems, utilities and applications, and may include embodiments of programs that implement various aspects of the present invention. Display control 48 provides an interface to display device 49. Scanner control 50 represents an interface to scanner device 51 that is an input device like an optical scanner. Printer control 52 represents an interface to printer device 53 that is an output device like an ink jet printer.

In the embodiment shown, all major system components connect to bus 41 which may represent more than one physical bus. For example, some personal computers incorporate only a so called Industry Standard Architecture (ISA) bus. Other computers incorporate an ISA bus as well as a higher bandwidth bus conforming to some bus standard such as the VESA local bus standard or the PCI local bus standard. Preferably, display control 48 connects to a high-bandwidth bus to improve the speed of display. A bus architecture is not required to practice the present invention.

The functions required to practice various aspects of the present invention can be performed by components that are implemented in a wide variety of ways including discrete logic components, one or more ASICs and/or program-controlled processors. The manner in which these components are implemented is not important to the present invention. For example, the operations required to practice the present invention can be implemented in a computer system such as computer system 40 by programs of instructions that are stored in storage device 47, copied into RAM 45 and executed by CPU 42.

Such software may be conveyed by a variety machine readable medium including magnetic tape, magnetic disk, optical disc, and baseband or modulated communication paths throughout the spectrum including from supersonic to ultraviolet frequencies. Various aspects can also be implemented in various components of computer system 40 by processing circuitry such as ASICs, general-purpose integrated circuits, microprocessors controlled by programs embodied in various forms of read-only memory (ROM) or RAM, and other techniques.

While the invention has been described in conjunction with several specific embodiments, many further alternatives, modifications and variations will be evident to those skilled in the art in light of the foregoing description. Thus, the invention described herein is intended to embrace all such alternatives, modifications, applications and variations as may fall within the spirit and scope of the appended claims.

What is claimed is:

1. A method for processing a digital input signal comprising signal elements, comprising the steps of:

identifying a selected patch from a plurality of zero-mean patches, each zero-mean patch comprising an anchor patch element having a value and one or more other patch elements each having a value, wherein the average of the patch element values of each zero-mean patch is substantially equal to zero;

identifying an anchor signal element corresponding to a selected location within the digital input signal; and processing each patch element of the selected patch with a respective signal element of the digital input signal, wherein the anchor patch element is processed with the anchor signal element and the one or more other patch elements are processed with other respective signal elements.

2. A method according to claim 1 for applying a watermark to the digital input signal in which the step for processing combines the patch elements of the selected patch with the respective signal elements of the digital input signal, wherein the anchor patch element is combined with the anchor signal element and the one or more other patch elements are combined with the other respective signal elements.

3. A method according to claim 2, further comprising:

identifying one or more additional selected patches;

identifying anchor signal elements corresponding to one or more additional selected locations within the digital signal; and processing each patch element of the additional selected patches with respective signal elements of the digital input signal, wherein for a respective additional selected patch the anchor patch element is processed with the anchor signal element corresponding to a respective additional selected location and the one or more other patch elements are processed with other respective signal elements.

4. A method according to claim 3 in which the signal elements represent information elements arranged in a raster and the patch elements and signal elements are processed in a sequence according to signal element order within the raster.

5. A method according to claim 2, further comprising modifying the values of the patch elements according to a pseudo-random number sequence such that the average of the patch element values in a respective selected patch is substantially equal to zero.

6. A method according to claim 2 in which the selected patch and the anchor signal element are identified according to a pseudo-random number sequence.

7. A method according to claim 2, further comprising scaling the values of the patch elements according to a pseudo-random number sequence.

8. A method according to claim 1 for detecting a watermark in the digital input signal in which the step for processing calculates a correlation score of the patch elements of the selected patch with the respective signal elements of the digital input signal, wherein the anchor patch element is correlated with the anchor signal element and the one or more other patch elements are correlated with the other respective signal elements.

9. A method according to claim 3, further comprising:

identifying one or more additional selected patches;

identifying anchor signal elements corresponding to one or more additional selected locations within the digital signal; and processing each patch element of the additional selected patches with respective signal elements of the digital input signal, wherein for a respective additional selected patch the anchor patch element is processed with the anchor signal element corresponding to a respective additional selected location and the one or more other patch elements are processed with other respective signal elements.

10. A method according to claim 9 in which the signal elements represent information elements arranged in a raster and the patch elements and signal elements are processed in a sequence according to signal element order within the raster.

11. A method according to claim 8, further comprising modifying the values of the patch elements according to a pseudo-random number sequence such that the average of the patch element values in a respective selected patch is substantially equal to zero.

12. A method according to claim 8 in which the selected patch and the anchor signal element are identified according to a pseudo-random number sequence.

13. A method according to claim 3, further comprising scaling the values of the patch elements according to a pseudo-random number sequence.

14. An apparatus for processing a digital input signal comprising signal elements, comprising:

means for identifying a selected patch from a plurality of zero-mean patches, each zero-mean patch comprising an anchor patch element having a value and one or more other patch elements each having a value, wherein the average of the patch element values of each zero-mean patch is substantially equal to zero;

means for identifying an anchor signal element corresponding to a selected location within the digital input signal; and means for processing each patch element of the selected patch with a respective signal element of the digital input signal, wherein the anchor patch element is processed with the anchor signal element and the one or more other patch elements are processed with other respective signal elements.

15. An apparatus according to claim 14 for applying a watermark to the digital input signal, wherein the processing means combines the patch elements of the selected patch with the respective signal elements of the digital input signal, and wherein the anchor patch element is combined with the anchor signal element and the one or more other patch elements are combined with the other respective signal elements.

16. An apparatus according to claim 15, wherein:
the patch identifying means identifies one or more additional selected patches;
the anchor signal element identifying means identifies anchor signal elements corresponding to one or more additional selected locations within the digital signal; and
the processing means processes each patch element of the additional selected patches with respective signal elements of the digital input signal, wherein for a respective additional selected patch the anchor patch element is processed with the anchor signal element corresponding to a respective additional selected location and the one or more other patch elements are processed with other respective signal elements.

17. An apparatus according to claim 16, wherein the signal elements represent information elements arranged in a raster and the processing means processes the patch elements and signal elements in a sequence according to signal element order within the raster.

18. An apparatus according to claim 15, further comprising means for modifying the values of the patch elements according to a pseudo-random number sequence such that the average of the patch element values in a respective selected patch is substantially equal to zero.

19. An apparatus according to claim 15, wherein the selected patch and the anchor signal element are identified according to a pseudo-random number sequence.

20. An apparatus according to claim 15, further comprising means for scaling the values of the patch elements according to a pseudo-random number sequence.

21. An apparatus according to claim 14 for detecting a watermark in the digital input signal, wherein the processing means calculates a correlation score of the patch elements of the selected patch with the respective signal elements of the digital input signal, and wherein the anchor patch element is correlated with the anchor signal element and the one or more other patch elements are correlated with the other respective signal elements.

22. An apparatus according to claim 21, wherein:
the patch identifying means identifies one or more additional selected patches;
the anchor signal element identifying means identifies anchor signal elements corresponding to one or more additional selected locations within the digital signal; and
the processing means processes each patch element of the additional selected patches with respective signal elements of the digital input signal, wherein for a respective additional selected patch the anchor patch element is processed with the anchor signal element corresponding to a respective additional selected location and the one or more other patch elements are processed with other respective signal elements.

23. An apparatus according to claim 22, wherein the signal elements represent information elements arranged in a raster and the processing means processes the patch elements and signal elements in a sequence according to signal element order within the raster.

24. An apparatus according to claim 21, further comprising means for modifying the values of the patch elements according to a pseudo-random number sequence such that the average of the patch element values in a respective selected patch is substantially equal to zero.

25. An apparatus according to claim 21, wherein the selected patch and the anchor signal element are identified according to a pseudo-random number sequence.

26. An apparatus according to claim 21, further comprising means for scaling the values of the patch elements according to a pseudo-random number sequence.

27. A medium readable by a device embodying a program of instructions for execution by said device to perform a method for processing a digital input signal comprising signal elements, wherein the method comprises:
identifying a selected patch from a plurality of zero-mean patches, each zero mean patch comprising an anchor patch element having a value and one or more other patch elements each having a value, wherein the average of the patch element values of each zero-mean patch is substantially equal to zero;
identifying an anchor signal element corresponding to a selected location within the digital input signal; and
processing each patch element of the selected patch with a respective signal element of the digital input signal, wherein the anchor patch element is processed with the anchor signal element and the one or more other patch elements are processed with other respective signal elements.

28. A device-readable medium embodying a program of instructions for execution by said device to perform a method according to claim 15 for applying a watermark to the digital input signal in which the step for processing combines the patch elements of the selected patch with the respective signal elements of the digital input signal, wherein the anchor patch element is combined with the anchor signal element and the one or more other patch elements are combined with the other respective signal elements.

29. A device-readable medium embodying a program of instructions for execution by said device to perform a method according to claim 28, the method further comprising:
identifying one or more additional selected patches;
identifying anchor signal elements corresponding to one or more additional selected locations within the digital signal; and
processing each patch element of the additional selected patches with respective signal elements of the digital input signal, wherein for a respective additional selected patch the anchor patch element is processed with the anchor signal element corresponding to a respective additional selected location and the one or more other patch elements are processed with other respective signal elements.

30. A device-readable medium embodying a program of instructions for execution by said device to perform a method according to claim 29, in which the signal elements represent information elements arranged in a raster and the patch elements and signal elements are processed in a sequence according to signal element order within the raster.

31. A device-readable medium embodying a program of instructions for execution by said device to perform a method according to claim 28, the method further comprising modifying the values of the patch elements according to a pseudo-random number sequence such that the average of the patch element values in a respective selected patch is substantially equal to zero.

32. A device-readable medium embodying a program of instructions for execution by said device to perform a method according to claim 28 in which the selected patch and the anchor signal element are identified according to a pseudo-random number sequence.

33. A device-readable medium embodying a program of instructions for execution by said device to perform a method according to claim 28, the method further comprising scaling the values of the patch elements according to a pseudo-random number sequence.

34. A device-readable medium embodying a program of instructions for execution by said device to perform a method according to claim 27, for detecting a watermark in the digital input signal in which the step for processing calculates a correlation score of the patch elements of the selected patch with the respective signal elements of the digital input signal, wherein the anchor patch element is correlated with the anchor signal element and the one or more other patch elements are correlated with the other respective signal elements.

35. A device-readable medium embodying a program of instructions for execution by said device to perform a method according to claim 29, the method further comprising:

identifying one or more additional selected patches;

identifying anchor signal elements corresponding to one or more additional selected locations within the digital signal; and processing each patch element of the additional selected patches with respective signal elements of the digital input signal, wherein for a respective additional selected patch the anchor patch element is processed with the anchor signal element corresponding to a respective additional selected location and the one or more other patch elements are processed with other respective signal elements.

36. A device-readable medium embodying a program of instructions for execution by said device to perform a method according to claim 35 in which the signal elements represent information elements arranged in a raster and the patch elements and signal elements are processed in a sequence according to signal element order within the raster.

37. A device-readable medium embodying a program of instructions for execution by said device to perform a method according to claim 34, the method further comprising modifying the values of the patch elements according to a pseudo-random number sequence such that the average of the patch element values in a respective selected patch is substantially equal to zero.

38. A device-readable medium embodying a program of instructions for execution by said device to perform a method according to claim 34 in which the selected patch and the anchor signal element are identified according to a pseudo-random number sequence.

39. A device-readable medium embodying a program of instructions for execution by said device to perform a method according to claim 34, the method further comprising scaling the values of the patch elements according to a pseudo-random number sequence.

* * * * *